June 12, 1951     W. M. NICHOLS     2,556,773
DIESEL ENGINE COMBUSTION CHAMBER

Filed April 25, 1947     2 Sheets-Sheet 1

INVENTOR
WILLIAM M. NICHOLS
BY
S. C. Yeaton
ATTORNEY

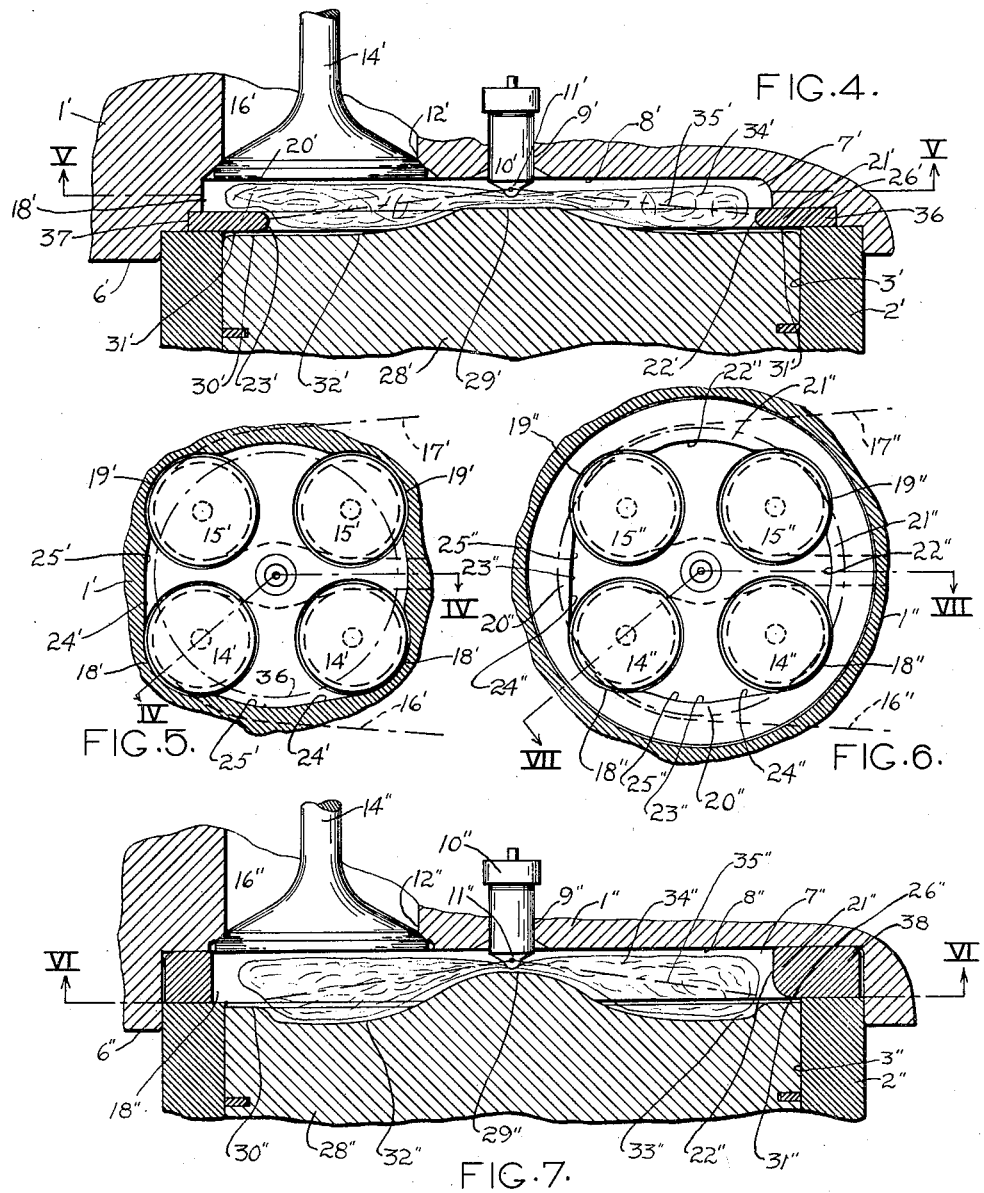

Patented June 12, 1951

2,556,773

UNITED STATES PATENT OFFICE 2,556,773

DIESEL ENGINE COMBUSTION CHAMBER

William M. Nichols, Schenectady, N. Y., assignor to American Locomotive Corporation, New York, N. Y., a corporation of New York Application April 25, 1947, Serial No. 743,787

8 Claims. (Cl. 123—32)

This invention relates to Diesel engine combustion chambers.

The present invention relates to, and provides a solution for, various problems known to exist in the designing of Diesel engines and encountered in designing the instant Diesel engine combustion chamber. For a full understanding of the present invention it is deemed necessary to consider the combustion chamber characteristics which are required of a modern small size high powered Diesel engine.

Such an engine must have a combustion chamber clearance or volume small enough to enable the engine, though cold, to start by the heat of compression. In a high powered Diesel engine such as a locomotive Diesel engine adapted to supply 2000 H. P., which must necessarily be limited as to size and height, this requires a compression ratio of about 13 to 1. Besides its volume the combustion chamber must be of a shape such that the spray of fuel from the fuel injection nozzle does not impinge upon any cold metal surface, as such impingement would result in poor combustion of the impinging fuel with the accompanying production of objectionable smoke. The usual Diesel engine injection nozzle has one or more circular rows of jets so that the fuel is sprayed into the combustion chamber in the shape of a cone and the cone angle is determined so that the outermost part of fuel spray does not touch the cylinder head nor that the inner part of the sprays do not impinge on the piston head.

In a supercharged Diesel engine the combustion chamber is provided with air under pressure for scavenging and for fuel combustion. Air enters the cylinder, of course, with turbulence, which turbulence persists during the whole suction stroke and following compression stroke, and fuel is injected into this turbulent air and is thus mixed with it. After the fuel has been injected and during the time of fuel burning, the air should still have sufficient turbulence or motion in the combustion chamber to cause further and more complete mixing of the air and fuel for otherwise some of the fuel particles will not find the necessary oxygen for combustion, while some other fuel particles will have an excess of available oxygen for combustion. This turbulence in the combustion chamber must also be of an orderly nature so that the mixing will be uniform for all loads, speeds, etc., and that fuel and air can be properly proportioned in all parts of the chamber.

The valve-controlled passages admitting air to the cylinder and permitting the discharge of exhaust gases from the cylinder must be as large as possible. The distance for spray penetration into the combustion chamber of the injected fuel should not change during the injection period and also the general shape of the combustion chamber at injection should be such that its change in shape during combustion will move as little as possible of the air to points outside the reach of the fuel jets. During fuel injection at full load the piston moves from about twenty degrees before top dead center to about twenty degrees after top dead center.

In designing an engine having the aforesaid characteristics, the problems are greatly multiplied if the engine is to be a light weight (locomotive) engine and still adapted to provide 2000 or more horse power. Such a type of engine is, by way of example, a locomotive Diesel engine where the ratio of the piston stroke to the cylinder bore cannot be large. The more limited the piston stroke is, the greater the problems encountered are. Long stroke engines are not suitable for locomotives since they are relatively heavy and costly and since their slow R. P. M. requires a heavy and costly generator. It is in view of this and in order to take advantage of the short stroke weight-saving feature that short stroke gasolene engines are employed where possible in other industries. In some cases the stroke used is even shorter than the cylinder bore diameter. This is feasible in the case of gasolene engines because the fuel is premixed in the carburetor and therefore there are no serious fuel injection problems to solve.

The progress of the Diesel engine has been in the direction of reducing the ratio of the piston stroke to the cylinder bore as much as possible. As this ratio is decreased the combustion problem is accordingly increased especially in supercharged 4-cycle engines since the clearance volume of the Diesel engine becomes so small that the injection of fuel into this thin combustion chamber results in the impingement of fuel sprays on both the cylinder head and piston walls with resulting objectionable smoke and poor combustion.

The problem is more complicated in the case of supercharged and scavenged engines since this necessitates the use of a period in which all valves remain open at the same time at top dead center of the exhaust stroke of the piston. With the thin combustion chamber it has been proposed to provide pockets in the top of the piston to provide the necessary clearance for the valve strokes. The provision of piston pockets becomes complicated by the requirements of large inlet and exhaust port diameters. Since it is not feasible to use a single inlet and a single exhaust port of exceedingly large diameter it becomes necessary to employ two inlet ports with two inlet valves acting simultaneously as one, and two exhaust ports with two exhaust valves acing simultaneously as one.

The aforementioned provision of pockets in the top of the piston to permit valve opening would increase the volume of the combustion chamber, and to counteract this the piston would have to be left with upstanding projections between the pockets to occupy and reduce the volume of the combustion chamber. These projections would be, of course, at the outer margin of the piston. They are objectionable both from a manufacturing cost standpoint and also from a temperature control standpoint. Furthermore, as the piston with the projections moves up or down, the shape of the combustion chamber is altered in an undesirable manner, and since the top of the projections necessarily extend substantially into contact with the uppermost surface of the inner wall of the cylinder head and are above the general plane of the piston, they tend to create a turbulence on the downstroke which carries the fuel particles up toward the cylinder head instead of pulling them down into the combustion chamber where air for combustion is available.

The main object of the present invention is to provide a Diesel engine having a combustion chamber which meets all of the aforesaid requirements and is free of the aforesaid objections.

More specifically, it is desired to provide a combustion chamber having the following characteristics:

1. Large air inlet and exhaust port areas are obtained by the use of four ports and four valves, the radially outermost margins of the valves being outside of the cylinder liner bore, and this provision of the valves overlapping the cylinder bore is obtained without cutting away the cylinder liner to permit the valve strokes.

2. The piston has a smooth top provided with gentle curving surfaces and is free of any pockets which might otherwise be required to permit the valve strokes. There are no upstanding individual projections at the rim of the piston which might produce poor heat conditions resulting in locally overheating the piston.

3. The margin of the piston is shaped so that it cooperates with the adjacent portions (depending projections) of the cylinder head to create a mild and orderly mixing turbulence or swish of air or air-gas mixture in the combustion chamber. This turbulence is caused, when the piston is on its upstroke, by the squeeze of the air or air-gas mixture between the marginal rim of the piston and the opposed portions of the cylinder head projections. In accordance with the present invention this squeeze takes place at the bottom of the top-dead-center combustion chamber.

4. If the aforesaid projections were on the piston, the clearance at the outer margins of the piston and the adjacent faces of the cylinder head would be at the top of the top-dead-center combustion chamber. According to the present invention where the projections are provided on the cylinder head the clearance is provided at the bottom of the top-dead-center combustion chamber, as aforesaid. When the piston is at top-dead-center, the clearance above the outer margin of the piston is very small. As the piston goes down this clearance rapidly increases and sucks in the surrounding mixture in the combustion chamber, and this pulls the fuel adjacent the top inner wall of the cylinder head surrounding the fuel nozzle downwardly and outwardly toward the wall of the cylinder liner, thereby distributing the fuel to portions where air is present so that it can be burned in the most efficient manner.

5. As aforesaid, in the case of a thin combustion chamber it has been proposed in the past to provide piston and cylinder liner pockets permitting the valve strokes, and this has resulted in piston projections. In accordance with the present invention the pockets have been eliminated and the projections have been eliminated from the top of the piston. Their counterparts may be found depending from the cylinder head where their size and shape do not have the same limitation as was the case where the projections were on the piston head. The projections are, in the case of the present invention, an integral part of the cylinder head, and therefore present no heat flow problem, are stationary, and do not change their distance from the fuel nozzle due to piston movement. Therefore the shape of the combustion chamber is not detrimentally affected by movement of the pistons.

6. Since the projections are fixed, that is integral with the cylinder head, they can be so shaped as to direct the incoming air in the desired direction to obtain the orderly turbulence required for efficient combustion. It is therefore in the shape of the cylinder head and the walls thereof, especially the radially inner walls of the cylinder projections, that the improvement of the combustion chamber originates, and this permits the top of the piston to be formed in any manner which is best from the standpoint of piston construction. The top of the piston head of the present invention is shaped to cooperate with the shape of the portion of the combustion chamber in the cylinder head so that the combustion chamber has the proper shape to permit the fuel jets from the fuel injection nozzle to shape into spray areas in the combustion chamber without undue impingement on either the piston or the cylinder head walls. However the piston top could be a dished shape or other conventional form without being outside of the scope of this invention.

If a piston were used where pockets were provided in the margin to permit the valve stroke, the fuel jets would impinge against the radially inner faces of the projections provided between the pockets, and the fuel jets could not be shortened to prevent this since, as soon as the piston moves down, the fuel jets must extend approximately to the cylinder bore, and also since other portions of the fuel jets would have to extend to the radially outer edges of the pockets. Moreover, these piston projections would be exposed to the greatest heat of the combustion chamber and would get unduly hot since it is impossible to adequately cool them. The corresponding projections of the present invention being formed on the cylinder head are thoroughly cooled by the cooling water circulating through the cylinder head and therefore do not overheat.

Other and further objects of this invention will appear from the following description, the accompanying drawings and the appended claims.

Referring to the drawings forming a part of this application:

Figure 1:
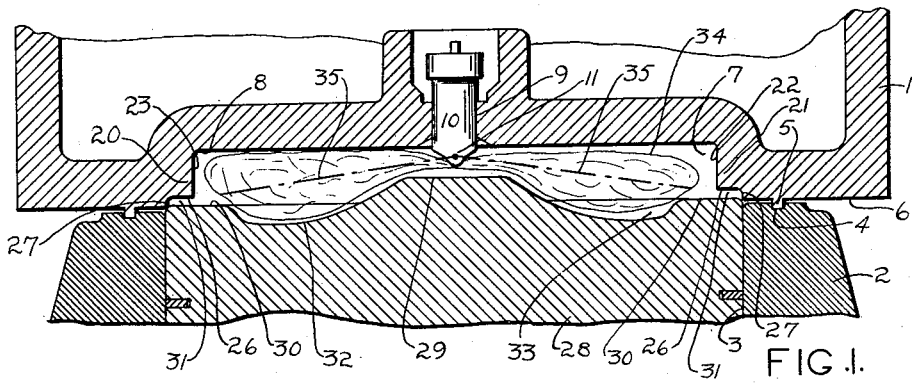
Fig. 1 is an axial section showing enough of a Diesel engine to illustrate the combustion chamber of the present invention, Fig. 1 being a section on the line I—I of Fig. 3.

Fig. 4, which is taken on the line IV—IV of Fig. 5, shows a modification of the present invention;

Fig. 5 is a reduced section on the line V—V of Fig. 4, showing the combustion chamber in full;

Fig. 6 is a view similar to Fig. 5, showing another modification of the present invention, being a section on the line VI—VI of Fig. 7; and Fig. 7 is an enlarged view taken on the line VII—VII of Fig. 6.

The present invention is shown in connection with one cylinder of a Diesel engine. The Diesel engine may be, for example, a 12- or a 16-cylinder V type engine of 1500 or 2000 rated horse power respectively, or more, which is supercharged and scavenged, as by turbo-supercharging.

The cylinder head is indicated generally by the reference numeral 1. It may be that type cylinder head wherein a separate cylinder head is employed for each cylinder. It is fastened on top of a cylinder liner 2. The cylinder liner may have a nine inch diameter bore 3 where, for example, the piston stroke is ten and one-half inches.

In its top face the liner has an annular groove 4 in which is disposed a depending annular tongue 5 integral with the bottom face 6 of the cylinder head. The tongue 5 and groove 4 are concentric with the axis of the bore 3. The inner edge of the face 6 is not entirely concentric with the bore 3 due to pockets cut therein, as will later be described.

The cylinder head is provided with a circular cavity 7 which forms a major part of the combustion chamber. The circular wall of the cavity 7 is interrupted as later appears. The top defining wall 8 of this cavity is parallel to the face 6. At its center it is provided with a bore 9 for the fuel injection nozzle 10. Nozzle 10 projects slightly into the cavity 7 and is provided with one or more rows of jet orifices 11, only one orifice 11 being shown.

The wall 8 is also provided with two air inlet ports 12, and two exhaust ports 13. Inlet valves 14 control the ports 12, and exhaust valves 15 control the ports 13. The valve operating mechanism is not shown but it will be such that the two valves 14 move simultaneously, and the two valves 15 move simultaneously. The two ports 12 open into a common air inlet passage 16 and the two exhaust ports 13 open to a common exhaust passage 17, the passages 16 and 17 leading to the same side of the cylinder head. The ports 12 and 13 and their valves 14 and 15 are of maximum diameter, being spaced radially sufficiently to provide for the bore 9 and fuel injection nozzle 10. The radially outermost parts of the valves 14 and 15 are beyond the bore 3, as may be clearly seen in Fig. 2. Thus maximum port area is obtained without cutting of the cylinder liner. Since the ports are in the wall 8, no pockets are needed in the piston to permit valve strokes. Thus the piston design can be chosen without consideration of valve stroke requirements.

Figure 2:
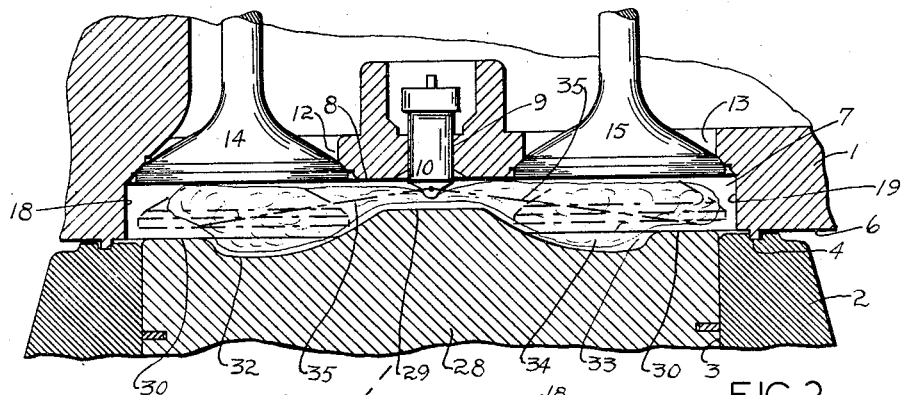
Fig. 2 is a section of the line II—II of Fig. 3, the open position of the valves being indicated in dot-dash lines.

Fig. 2 shows the maximum diameter of the cavity 7, and it will be seen that this diameter is greater than the diameter of the bore 3. This diameter extends from the outermost part of the pocket 18 provided for one inlet valve 14 to the outermost part of the pocket 19 provided for one exhaust valve 15. Looking at Fig. 3, it will be seen that along a similar diameter at right angles another pocket 18 is formed for the other inlet valve 14, and another pocket 19 is formed for the other exhaust valve 15. Pockets 18 and 19 are arcuate and coaxial with their respective valves.

Figure 3:
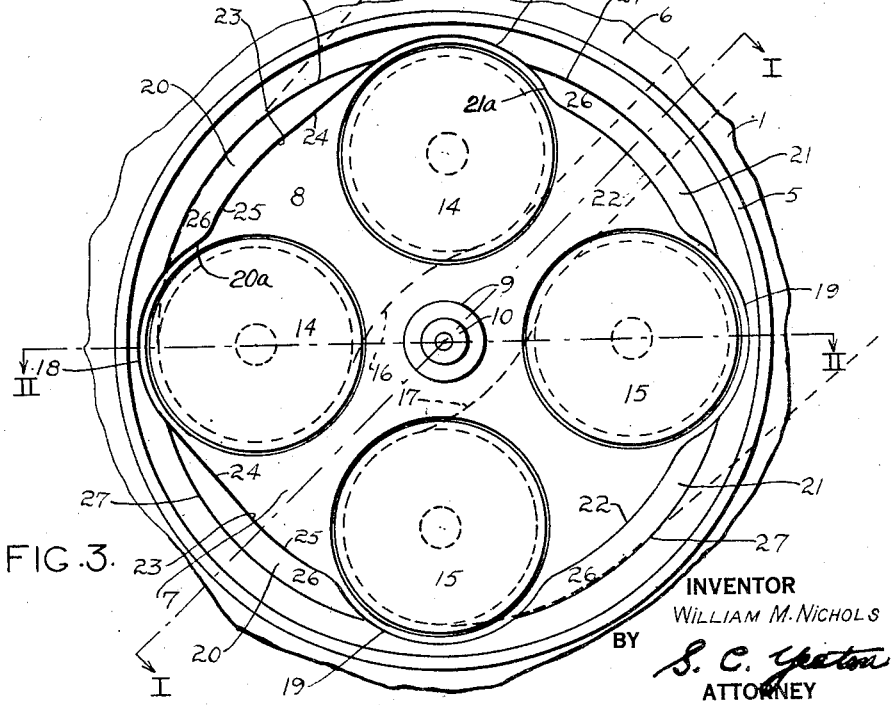
Fig. 3 is an inverted view of enough of the cylinder head to show the features of the present invention.

The cavity 7 might have been made concentric with but larger than the bore 3 in which case it would be of a uniform diameter equal to the distance between the outermost parts of opposed pockets 18—19. This would have resulted in an enlarged combustion chamber which would have been undesirable for the nine inch bore-ten and one-half inch stroke engine since then compression would be inadequate to cause ignition in a cold engine. Accordingly the cylinder head is provided with two depending adjacent projections 20 of one particular shape, and two more depending adjacent projections 21 of another particular shape, arranged as shown in Fig. 3. These projections may also be considered as extending radially inward from the wall of cavity 7. The projections 21 have vertical inner faces 22 concentric with the bore 3. The shape of faces 22 is of no particular importance. The projections 20 have vertical inner faces 23 and these faces are of a shape which is of great importance in carrying out the present invention.

These faces 23 form inlet air guides. The faces 23 are substantially similar. Each includes a part 24 which is tangential to the adjacent inlet port 12 so that air flowing into the cavity 7 from each inlet port 12 is guided by the adjacent tangential part 24 into a whirl around the combustion chamber, the axes of the bore 3 being the center of the whirl. The part 24 is followed by a curved part 25 which tends to turn the incoming air leaving the tangential part 24 into the beginning of its whirl.

The projection 21 adjacent the inlet valve and the projection 20 between the two inlet valves are formed with arcuate faces 21a and 20a respectively at their rear ends (as viewed in a clockwise direction in Fig. 3). These faces are continuous with and on the same radius as the vertical walls of the valve pockets adjacent to them and serve to guide into the pockets in a whirling motion a part of the charging air supplied through the inlet valves. The air continues in a whirling motion along the pocket walls and thence along the straight parts of faces 24 tangential to the ports thereafter to be turned inwardly in a whirling motion toward the center of the bore 3 by the curved portions 25. The projections 20 and 21 also have horizontal bottom faces 26, all in the same plane and parallel to but usually spaced above the face 6, and the faces 26 have usually spaced above the face 6, and the faces 26 have their outermost edge coinciding with the bore 3, as is clearly shown in Fig. 1, this outermost edge being in line with a short vertical wall 27 connecting the faces 26 and 6. Wall 27 is a part of the circular wall which defines cavity 7.

A piston 28 is provided in the bore 3. The piston has a flat central disc 29 which, at top dead center of the piston, is only slightly spaced from the injection nozzle 10, as is clearly shown in Figs. 1 and 2, and further has a flat annular rim 30 which is spaced vertically below the disc 29. Rim 30 is spaced a short distance from faces 26 thereby providing, when the piston is at top dead center, small clearances 31. The rim 30 is connected to the disc 29 by a torus-shaped wall 32 which is graceful and which dips below the rim 30 to provide an annular depression 33, and then extends above the rim 30 to merge with the disc 29. While the depression 33 tends to increase the size of the combustion chamber, this is counteracted by the center knob having the disc 29, which tends to decrease the size of the combustion chamber. In Figs. 1 and 2 the piston is shown at top dead center, defining the bottom of the combustion chamber, and the entire shape of the combustion chamber can then be seen by reference to Figs. 1 to 3. The depression 33 coacts with the wall 8 to provide a ring-shaped portion of the combustion chamber adapted to nicely receive the spray of atomized fuel 34, the center line of which is indicated at 35. It will be seen that this fuel spray 34 in the main is of the same shape as and fills the main portion of the combustion chamber without any direct impingement of fuel upon the walls of the piston and cylinder head. The main spray follows the center line 35 and does not meet any obstruction since it normally terminates short of the cylinder liner 2 at any event. Thus all of the fuel is atomized in space and not upon metal surfaces. There are several horizontal rows of jet orifices 11 in the top of the nozzle 10 arranged to provide the spray 34.

The structure of the combustion chamber has been described and its operation will now be set forth, tying the various structural features together with the aforesaid objects of the invention.

The exhaust ports 13 are opened for exhaust before the air inlet ports 12 are opened. Upon opening the air inlet ports 12, the scavenging air under pressure rushes into the cylinder forcing the exhaust gases out through the exhaust ports 13, the scavenging air then following the exhaust until the exhaust ports are closed. Charging air then continues to enter the cylinder through the inlet ports 12 until these ports are in turn closed by their valves 14. The air entering the cylinder through the ports 12 is guided by faces 20a and 21a of the projections 20 and 21 respectively into the recesses formed by the adjacent pockets 18 and then by the pocket walls to the wall parts 24 which are tangent to the ports 12 and is forced to enter into a rotary movement around the cylinder by the tangent parts 24 and the following curved wall parts 25. The air is thus in circular motion in the cylinder when the piston reaches its position of substantially 20° before top dead center at which time fuel injection begins.

The fuel is thereby injected through the jet orifices 11 into a whirling mass of air, and since the fuel is finely atomized, it thoroughly mixes in this whirling body of air.

As the piston travels from 20° before top dead center to top dead center, it reduces the clearances 31 and squeezes the air or air-gas mixture therein, forcing it inward against the rim 30 which results in scouring away any fuel particles which may have located adjacent this rim 30, these fuel particles thereby being forced to disperse in the combustion chamber and to mix with the available air therein. The fuel being injected through the rows of jet orifices 11 forms a cone of mist of a shape substantially as shown in the drawings, and the piston and cylinder head have been shaped to form a chamber to receive this cone of mist so that no liquid oil or oil mist impinges directly on the outermost or cooler parts of the piston and cylinder which, if it occurred, would cause poor combustion and smoking of the engine after the fuel has been ignited. In other words, the depression 33 and cavity 7 coact to receive the oil spray without impingement on metal surfaces, thereby assuring complete mixing of the oil mist and air to form a combustible mixture entirely filling the combustion space.

At top dead center the combustion chamber is of a size which will effect compression to the ignition point, this size having been reduced by the projections 20 and 21 and piston center knob to a volume suitable, by way of example, for a nine inch diameter, ten and one-half inch stroke Diesel engine producing a rated 1500 horsepower with twelve cylinders or 2000 horsepower with sixteen cylinders. The combustion chamber will be full of pure air due to the very effective scavenging of the cylinder permitted by the large inlet port areas and exhaust port areas.

As the piston starts on its downward or power stroke, the clearances 31 are enlarged, providing an area into which the combustible mixture is pulled, and this pulling downwardly of the combustible mixture helps to pull away any fuel particles which have not been thoroughly mixed with air and which may be suspended in the uppermost and outermost regions of the combustion chamber, thereby insuring complete mixing of the air and fuel for combustion.

The large inlet and exhaust port areas necessitate the wide diameter of the cavity 7, taken through the center line of diametrically opposite ports, and it is only by the inclusion of the projections 20, 21, that the combustion chamber is limited to its proper volume. Movement of the piston toward and away from the projections 20, 21 does not change the effective shape of the combustion chamber but merely diminishes its volume, or, in fact, as far as the shape is concerned, merely increases the clearances 31. This permits orderly motion of the gases in the combustion chamber and provides for the cooling of the projections 20, 21, so that their temperatures do not become excessive, these projections being cooled by the cooling water circulating through the cylinder head in the usual manner.

The engine described has been shown, by way of example, as a valve-in-head type four-cycle engine, and only that much of the cycle has been described which is pertinent to the present invention, namely the period shortly before and after top dead center of the piston as it approaches and enters its power stroke.

A modification of the invention is shown in Figs. 4 and 5. It differs from the embodiment of Figs. 1–3 mainly in that a ring 36 is secured in a recess 37 between the cylinder liner 2' and the cylinder head 1'. There is thus obtained a uniform clearance 31' completely around the cylinder. Furthermore, the ring 36 is in poor heat transfer relation with the cylinder head and liner, and therefore maintains a higher temperature than the adjacent parts. The tangential guiding part 24' and adjacent curved part 25' for each inlet port 12' are formed on the cylinder head in a manner similar to the manner in which they are formed on the cylinder head of the embodiment of Figs. 1–3, but these parts are overlapped by the ring 36, as may be clearly seen in Fig. 5 wherein the ring 36 inside diameter is indicated by dot and dash lines. The projections 20', 21' are thus formed by the ring 36 and the vertical inner faces 22', 23' are merely the inner periphery of the ring 36. The piston has been shown without the annular depression 33 but it may have it if desired.

The embodiment of Figs. 6 and 7 combines in one structure the advantages of the two embodiments of Figs. 1–3 and 4–5. In place of the ring 36 it has a thick ring 38, and this ring 38 has an inside periphery which is similar to the walls 22, 23 of the cavity 7 of Fig. 1. Thus, as can be seen by a comparison of Figs. 6 and 3, the combustion chamber is similar to the combustion chamber of Figs. 1–3 but it obtains the benefits of the high temperature low heat transfer ring. It is obvious also that manufacturing benefits are obtained since the machining of the faces 33″ and 23″, and parts 24″ and 25″ takes place on a separate ring and not on the cylinder head.

The operation of the combustion chambers of Figs. 4–5 and 6–7 respectively, are similar to the operation of the combustion chamber of Figs. 1–3. Parts of the two embodiments of Figs. 4–5 and 6–7 respectively which correspond to like parts of the embodiment of Figs. 1–3 are indicated by like references with distinguishing accents, and no further description of the structure or operation of these additional two embodiments is deemed necessary.

While there have been hereinbefore described approved embodiments of this invention, it will be understood that many and various changes and modifications in form, arrangement of parts and details of construction may be made thereto without departing from the spirit of the invention, and that all such changes and modifications as fall within the scope of the present invention are contemplated as a part of this invention.

The invention claimed and desired to be secured by Letters Patent is:

1. An internal combustion engine combustion chamber comprising a cylinder; a piston in said cylinder; a cylinder head having a cavity superimposed over said piston and forming therewith, when said piston is at top dead center, a combustion space, said cylinder head having two connected inlet ports and two connected exhaust ports in the top defining wall of said cavity and valve pockets therefor in the side defining wall of said cavity extending radially beyond said piston, and further having integral projections between said pockets overlapping the marginal rim of said piston; and a symmetrical ring secured between said cylinder and head, said ring being disposed entirely above the plane of the top surface of the cylinder and overlapping said piston with slight 360° clearance when said piston is at top dead center whereby, on the piston compression stroke, gas is squeezed in the diminishing clearance between said rim and said ring inwardly into said combustion chamber and, during the piston power stroke, gas in said combustion chamber is drawn into the enlarging clearance between said piston rim and ring, thereby pulling down fuel particles from the uppermost regions of said combustion chamber, the inside face of each of said projections at the flow side of each of said inlet ports being tangential thereto and then curved for directing the inflowing gas into a whirl in said combustion chamber.

2. An internal combustion engine combustion chamber comprising a cylinder; a piston in said cylinder; a cylinder head; and a ring secured between said cylinder and head, said ring being disposed entirely above the plane of the top surface of the cylinder and overlapping said piston, said head having a cavity lined by said ring and superimposed over said piston and forming therewith, when said piston is at top dead center, a combustion space, said cylinder head having two connected inlet ports and two connected exhaust ports in the top defining wall of said cavity and valve pockets therefor in said ring extending radially beyond said piston, said ring having integral projections between said pockets overlapping the marginal rim of said piston with slight clearance when said piston is at top dead center whereby, on the piston compression stroke, gas is squeezed in the diminishing clearance between said rim and said projections inwardly into said combustion chamber and, during the piston power stroke, gas in said combustion chamber is drawn into the enlarging clearance between said piston rim and projections, thereby pulling down fuel particles from the uppermost regions of said combustion chamber, the inside face of each of said projections at the flow side of each of said inlet ports being tangential thereto and then curved for directing the inflowing gas into a whirl in said combustion chamber.

3. A Diesel engine combustion chamber comprising an uninterrupted cylinder liner; a piston in said liner having a rim normally disposed at top dead center substantially even with the top of said liner and a circular boss at the center of said piston higher than said rim; a cylinder head having a cavity superimposed over said piston and forming therewith, when said piston is at top dead center, a combustion space, said cylinder head having two connected air ports and two connected exhaust ports in the top defining wall of said cavity and valve pockets therefor in the side defining wall of said cavity extending radially beyond said piston, and further having integral projections between said pockets overlapping said piston rim; a symmetrical ring secured between said cylinder and head, said ring being disposed entirely above the plane of the top surface of the cylinder and overlapping said piston with slight 360° clearance located at the bottom of said combustion chamber when said piston is at top dead center whereby, on the piston compression stroke, gas is squeezed in the diminishing clearance between said rim and said ring inwardly into said combustion chamber to create turbulence for mixing air and fuel and, during the piston power stroke, gas in said combustion chamber is drawn into the enlarging clearance between said piston rim and ring, thereby pulling down fuel particles from the uppermost regions of said combustion chamber, the inside face of each of said projections at the flow side of each of said air ports being tangential thereto and then curved for directing the inflowing gas into a whirl in said combustion chamber; and a fuel injection nozzle in said head above said boss.

4. A Diesel engine combustion chamber comprising an uninterrupted cylinder liner; a piston in said liner having a torus-shaped depression in its top face providing a rim normally disposed at top dead center substantially even with the top of said liner and further providing a circular boss at the center of said piston higher than said rim; a cylinder head; and a ring secured between said cylinder and head, said ring being disposed entirely above the plane of the top surface of the cylinder and overlapping said piston, said head having a cavity lined by said ring and superimposed over said piston and forming with said depression, when said piston is at top dead center, a combustion space, said cylinder head having two connected air ports and two connected exhaust ports in the top defining wall of said cavity and valve pockets therefor in said ring extending radially beyond said piston, said ring having integral projections between said pockets overlapping said piston rim providing slight clearances located at the bottom of said combustion chamber when said piston is at top dead center whereby, on the piston compression stroke, gas is squeezed in the diminishing clearance between said rim and said projections inwardly into said combustion chamber to create turbulent mixing in said combustion space and, during the piston power stroke, gas in said combustion chamber is drawn into the enlarging clearance between said piston rim and projections, thereby pulling down fuel particles from the uppermost regions of said combustion chamber, the inside face of each of said projections at the flow side of each of said air ports being tangential thereto and then curved for directing the inflowing gas into a whirl in said combustion chamber; and a fuel injection nozzle in said head above said boss.

5. A compression-ignition engine cylinder head having a cylindrical cavity facing the piston, an inlet valve port, a circular pocket for the inlet valve extending partially into the cavity wall to form a recess therein with an arcuate wall, a projection integrally formed upon the cavity wall and having an arcuate face continuous with the arcuate wall of the recess, said projection being adapted to guide a part of the charging air supplied through the inlet valve in a course along the arcuate wall of the recess thereby to impart a whirling motion thereto, an exhaust valve port, and second projection integrally formed upon the cavity wall between the inlet and exhaust ports and having an inner face tangent to the circumference of the circular inlet port and parallel to the line connecting the centers of the inlet and exhaust valve ports, such face having an extended portion curved inwardly toward the cavity center to continue the whirling motion of the charging air.

6. A compression-ignition engine cylinder head having a cylindrical cavity facing the piston, an inlet valve port, a circular pocket for the inlet valve extending partially into the cavity wall to form a recess with an arcuate wall therein, a projection integrally formed upon the cavity wall and having an arcuate face continuous with the arcuate wall of the recess, said face being adapted to impart a whirling motion to the charging air and to guide such air toward the arcuate wall of the recess, and a second projection integrally formed upon the cavity wall and having a straight face disposed in continuity with the recess wall and tangent to the circumference of the circular pocket at the point where said face joins the recess wall, such face having a portion beyond the straight portion which curves inwardly towards the cavity center to continue the whirling motion of the charging air.

7. A cylinder head for a compression-ignition engine having a cylindrical cavity facing the piston which is adapted to form a combustion chamber with the piston and cylinder, a port for the inlet valve, a circular valve pocket extending partially into the cavity wall to form a recess having an arcuate wall, a projection integrally formed upon the cavity wall adjacent the recess and having an arcute face continuous with the arcuate wall of the recess, said projection being adapted to impart whirling motion to the charging air and to guide such air in an arcuate course into the recess, and a second projection integrally formed upon the cavity wall on the circumferentially opposite side of the recess and having a face in continuity with the recess wall, such face being tangent to the arc of the pocket at the point where the recess wall joins such face and having an end portion curving inwardly toward the cavity center to continue the whirling motion of the charging air.

8. A cylinder head for an internal combustion engine comprising a body having a cylindrical cavity opening toward the piston; a pair of adjacent ports for first and second inlet valves; a pair of adjacent ports for first and second exhaust valves; circular pockets for each of the inlet valves extending partially into the cavity wall to form recesses therein with arcuate walls; and three projections integrally formed upon the cavity wall, the first projection being disposed between the first exhaust port and the first inlet port and having an arcuate face continuous with the arcuate wall of the recess and being adapted to impart a whirling motion to the charging air from the first inlet valve and to guide such air in an arcuate course along the recess wall, the second projection being disposed between the first and second inlet ports and having a straight face tangent to the valve pocket and parallel to the line connecting the centers of the inlet ports, such face having a portion beyond the tangent portion turning radially inwardly in a gentle curve to guide the charging air from the first inlet valve pocket in a whirling course into the combustion chamber, such second projection further having an arcuate end face continuous with the arcuate wall of the pocket recess of the second inlet valve to guide a part of the charging air supplied through such second inlet valve into an arcuate course along the arcuate wall of the second recess, and the third projection having a straight face with a curved portion of the same construction as the second projection and disposed adjacent the second pocket recess to guide the charging air from the second inlet valve in a whirling course into the combustion chamber.

WILLIAM M. NICHOLS.

REFERENCES CITED

The following references are of record in the file of this patent:

UNITED STATES PATENTS

| Number | Name | Date |
| --- | --- | --- |
| 1,856,328 | French | May 3, 1932 |
| 2,001,358 | Guernsey | May 14, 1935 |
| 2,055,814 | Dennison | Sept. 29, 1936 |
| 2,126,939 | Winfield | Aug. 16, 1938 |
| 2,292,409 | Steward | Aug. 11, 1942 |
| 2,349,305 | Pyk | May 23, 1944 |